United States Patent Office 3,409,625
Patented Nov. 5, 1968

3,409,625
(Py)-N-OXIDES OF CERTAIN CARBAMATES OF 2-PYRIDINEMETHANOL
Masayuki Ishikawa, 17 4-chome, Tokiwa-daire, Matsudo-shi, Chiba-ken, Japan; Tatsuo Shimamoto, 13 Kita-machi, Shinjuku-ku, Tokyo, Japan; and Hisako Ishikawa, 17 4-chome, Tokiwa-daire, Matsudo-shi, Chiba-ken, Japan
No Drawing. Filed Dec. 7, 1965, Ser. No. 512,234
Claims priority, application Japan, Dec. 8, 1964, 39/68,652, 39/68,653, 39/68,654
5 Claims. (Cl. 260—295)

ABSTRACT OF THE DISCLOSURE (Py)-N-oxides of N-alkyl- and N,N'-dialkylcarbamates and thioncarbamates of 2-pyridinemethanol were prepared, preferably from the N-oxide of 2-pyridinemethanol, and found in mammals to exhibit anti-inflammatory activity and to prevent passive cutaneous anaphylaxis. 2 - pyridinemethanol N-methyl-carbamate (py)-N-oxide was a preferred compound.

Summary of the invention

A compound having the formula

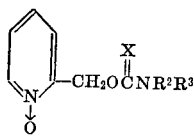

wherein X is a member selected from the group consisting of oxygen and sulfur and $R^2$ and $R^3$ are each a member selected from the group consisting of hydrogen and (lower)alkyl.

Detailed description

This invention relates to new synthetic compounds having valuable anti-inflammatory properties and, more particularly, to N-mono- and di-alkyl carbamates and thioncarbamates of pyridine alcohols and their (py)-N-oxides.

It was the object of the present invention to provide novel and nontoxic compounds which in mammals exhibit anti-inflammatory activity and prevent passive cutaneous anaphylaxis and which by their nature are free of the undesirable side-effects caused by the steroids generally used for such purposes. It was a further object of the present invention to provide nontoxic agents useful in the alleviation of the symptoms of such inflammatory processes as arthritis and purpura.

The objects of the present invention have been achieved by the provision according to the present invention, of a member selected from the group consisting of a compound of the formula:

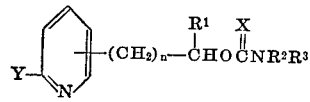

wherein $R^1$ and $R^2$ are each a member selected from the group consisting of hydrogen and (lower)alkyl, $R^3$ is a member selected from the group consisting of hydrogen, (lower)alkyl, aralkyl and a heterocyclic or hetero-aromatic radical, X is a member selected from the group consisting of oxygen and sulfur, Y is a member selected from the group consisting of hydrogen, halogen, alkyl, hydroxyl, cyano, aldoxime, carboxyl, carboalkoxy and amidocarboxyl which may be mono- or di-substituted with (lower)alkyl group and $n$ means a number of from 0 to 4, and the group consisting of a compound of the formula

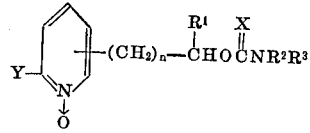

wherein $R^1$, $R^2$, $R^3$, X, Y and $n$ have the same meaning set forth above; and nontoxic, pharmaceutically acceptable acid addition salts thereof, including salts with organic and inorganic acids such as hydrochloric acid, hydrobromic acid, sulfuric acid, phosphoric acid, acetic acid, maleic acid, tartaric acid, citric acid, sulfamic acid, glycolic acid, succinic acid, ascorbic acid and the like.

Preferred embodiments of the present invention are the compounds of the formulae

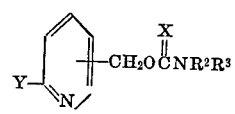

and

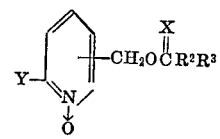

wherein $R^2$, $R^3$, X and Y have the same meaning set forth above.

The compounds of the present invention are synthesized from alcohols of the structure

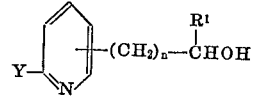

or the (py)-N-oxide derivative of the compounds of Formula I in any one of five ways, i.e.

(a) The compound of the Formula I or its (py)-N-oxide is reacted with a compound represented by the formula:

$$R^2NC{\equiv}X \qquad (II)$$

or (b) The compound of the Formula I or its (py)-N-oxide is reacted with a compound represented by the formula:

wherein Z means a chloride atom, alkoxy-, or phenoxy group, or (c) The compound of the Formula I or its (py)-N-oxide is reacted with phosgene or thiophosgene and then reacted with an amine represented by the formula:

or (d) The compound of the Formula I or its (py)-N-oxide is converted by known processes to an aryloxy-formate ester and the aryloxyformate ester is reacted with the amine of Formula IV, or (e) The compound of Formula I or its (py)-N-oxide is converted by known processes to an azidoformate and then the azidoformate is reacted with the amine of the Formula IV. In the above Formulae I, II, III, and IV, $R^1$, $R^2$, $R^3$, X, Y and $n$ have the same meanings as described hereinbefore.

Alternatively, (py)-N-oxide derivative of the above-mentioned pyridinealcohol carbamates and thioncarbamates can be also manufactured by the process, in which the compound of the Formula I is carbamoylated by the process (a), (b), (c), (d), or (e), and then the product is oxidized with inorganic or organic peroxide by the known processes.

In the embodiment of the process (a), the compound of the Formula I or its (py)-N-oxide is reacted with one mole or an excess, especially 1.5 to 2 mole of the compounds of the Formula II in a solvent or diluent. The suitable solvents or diluents are inactive solvents such as benzene, toluene, chlorobenzene, acetonitrile, chloroform, tetrahydrofuran, or pyridine. The reaction is preferably carried out at a temperature of from room temperature to 150° C., especially under 100° C. If necessary, a catalyst such as tertiary amine, for example, trimethylamine triethylamine, N-alkylpiperidine, and pyridine may be used in the reaction. When an isothiocyanate as the compound of the Formula II is reacted, it is preferable to use alkali metal alkoxide such as potassium tert-butoxide as a catalyst. In place of the isocyanate of the Formula II, compounds which can be converted to the isocyanate of the Formula II under the reaction conditions can be used and if necessary a catalyst to generate the isocyanate may be used. For example, acyl azides represented by the formula: $R^2CON_3$, or S-alkyl thiolcarbamates represented by the formula: $R^2NHCOS$-alkyl may be used under heating, and S-alkyl thiolcarbamates may be also used in the presence of trialkylamine and heavy metal salt such as silver nitrate.

In the embodiment of the process (b), the compounds of the Formula I or its (py)-N-oxide derivative is reacted with the functional derivatives of carboxylic acid represented by the Formula III. When the functional derivative is an acid chloride, that is Z=Cl, the reaction is carried out in a suitable solvent or diluent such as benzene, toluene, chlorobenzene, diethyl ether, pyridine, and chloroform. The other reaction conditions are similar to that described above in the process (a). On the other hand, when the functional derivative is an ester of acid, it is necessary to use a catalyst. As the catalyst, sulfuric acid, toluenesulfonic acid, metal alkoxides, for example, aluminum isopropoxide and potassium tert-butoxide are preferable. As the solvent or diluent, benzene, toluene, chlorobenzene, and tetrahydrofuran are suitable. The reaction is carried out at a temperature of about the boiling point of the solvent or diluent. While the reaction proceeds, slow distillation of the solvent or diluent from the reaction system improves the yield of the objective product.

In the embodiment of the process (c), the compound of the Formula I or its (py)-N-oxide derivative is dissolved or suspended in a solvent or diluent such as benzene, toluene, chlorobenzene, diethyl ether, diisopropyl ether, or chloroform. The solution or suspension is preferably added with tertiary amine, for example, dimethylaniline, diethylaniline, or pyridine as a catalyst or dehydrochlorinating agent and then added with phosgene and thereafter added with ammonia, monoalkylamine, or dialkylamine to effect the reaction. The reaction is effected at a room temperature or lower, particularly below 10° C.

In the embodiment of the process (d), the aryloxyformate ester which is represented by the formula:

$$\text{Y} \underset{N}{\underset{\|}{\bigcirc}} -(CH_2)_n-\overset{R^1}{\underset{|}{C}}HOCO-Ar \quad (V)$$

wherein Ar means preferably phenyl group which may be substituted with a halogen atom, alkyl-, alkoxy-, or nitro-group or (py)-N-oxide derivative of the Formula V is reacted with the amine represented by the Formula IV at a temperature of from 0° to 100° C., preferably at around room temperature. The reaction can be effected in the presence or absence of solvents or diluents. As the solvent or diluent, methanol, ethanol, and the other low molecular alcohols can be used. The arylformate ester of the Formula V or its (py)-N-oxide derivative, which is necessary in the process (d), can be prepared easily from the pyridinealcohol of the Formula I or its (py)-N-oxide derivative by known processes, for example, by reaction with arylchloroformate.

In the embodiment of the process (e), azidoformate of the following general formula:

$$\text{Y} \underset{N}{\underset{\|}{\bigcirc}} -(CH_2)_n-\overset{R^1}{\underset{|}{C}}HOCON_3$$

wherein $R^1$, Y and $n$ have the same meaning as described hereinbefore, is reacted with the amine represented by the Formula IV at a temperature of from 0° to 100° C., preferably at around room temperature. The reaction can be effected in the presence or absence of solvents or diluents. The azidoformate, which is necessary in the process (e), can be prepared easily from the pyridinealcohol of the Formula I or its (py)-N-derivative by the known process: for example, the compound of the Formula I or its (py)-N-oxide derivative is converted to an aryl- or alkylformate by reaction with aryl- or alkylchloroformate, and the aryl- or alkylformate is converted to an ester of carbazinic acid by reaction with hydrazine, and then the ester of carbazinic acid is reacted with nitrous acid.

The (py)-N-oxide derivative of the pyridinealcohol carbamates and thioncarbamates can be also manufactured by the process, in which the compound of the Formula I is carbamoylated by the processes (a), (b), (c), (d), or (e), and then the product is oxidized with inorganic- or organic peroxide by known processes. As the peroxide, especially hydrogen peroxide is preferred and organic peracids such as monoperphthalic acid may also be used. When hydrogen peroxide is used, the combination of hydrogen peroxide-acetic acid is preferred, and the reaction is conducted at a temperature of from 60° to 100° C. When monoperphthalic acid is used, the combination of monoperphthalic acid-ether is preferred, and the reaction is conducted at around room temperature.

In the procedure of the process of the present invention, the products can be separated and purified by conventional methods as described hereinafter.

The pyridinemethanols used as reagents in the processes of the present invention are prepared most frequently from the esters of the corresponding pyridine carboxylic acids by reduction with a complex metal hydride, (e.g. lithium aluminum hydride, di-isobutyl aluminum hydride, sodium borohydride) according to Mosher et al., J. Amer. Chem. Soc. 73, 4926 (1951).

In another procedure for obtaining substituted 2- or 4-pyridine methanols, the corresponding picoline is heated with 30% hydrogen peroxide in glacial acetic acid and then treated with acetic anhydride according to the directions of Boekelheide et al., J. Amer. Chem. Soc. 76, 1286–1291 (1954) to give the acetate from which the desired 2- or 4-pyridine methanol is obtained by hydrolysis with hydrochloric acid.

Alternatively, ketone and aldehyde derivatives of appropriately substituted pyridine are reduced by catalytic hydrogenation according to Panizzon, Helv. Chim. Acta., 24E, 24 (1941) and Mathes et al., Ber. 86, 584 (1953). Pyridinealdehydes are also reduced to pyridine-alcohols by aluminum isopropoxide reduction, as illustrated by the procedure of McDonald, J. Amer. Chem. Soc. 69, 1219 (1947).

The term "(lower)alkyl" as used herein refers to straight and branched chain saturated monovalent aliphatic hydrocarbon radicals having from one to ten carbon atoms inclusive, e.g. methyl, ethyl, propyl, isopropyl, normal and iso- and secondary and tertiary-butyl, amyl, decyl, etc. The preferred (lower)alkyl groups are those having from one to six carbon atoms.

The compounds of this invention are useful in the treatment of disease in animals, including particularly the higher animals such as man and horses, dogs, etc. The compounds are particularly useful in the treatment of inflammatory diseases, including rheumatic fever, purpura rheumatica and rheumatoid arthritis. The utility of the present compounds is enhanced by the absence of steroidal side effects.

The compounds are administered to the affected host in amounts ranging from 2 to 50 mg. per kilogram of body weight per day. The usual dosage is from about 5 to about 30 mg. per kg. per day. The compounds can be administered parenterally and, preferably, orally. The compounds can be orally administered in the conventional forms, i.e. as tablets, capsules, suspensions, etc. The compounds of this invention can be combined in one dosage form with other therapeutically effective agents, including analgesics and the steroids which have also been used in the treatment of inflammatory disease.

The present invention is illustrated but not limited by the following examples in which the parts used are parts by weight and all temperatures are given in degrees centigrade. In the examples, all the ultraviolet spectra (abbreviated by UV-spectra or spectrum) were measured in 95% ethanol solution, and in the infrared spectra, absorption maxima are shown in wave number (cm.$^{-1}$), but absorption peaks appearing in the range of 3000–2900 cm.$^{-1}$ were omitted.

Example 1

To a solution of 11 parts of 4-pyridinemethanol in 60 parts by volume of pyridine was added 8 parts of methylisocyanate. The solution was allowed to stand at room temperature for 12 hours and then heated for 2 hours at 100° C. The solvent was distilled off under reduced pressure, and then the resulting residue was distilled in vacuum to give 12 parts of 4-pyridinemethanol N-methylcarbamate boiling at 130–135° C./4 mm. Hg. The picrate of the product melted at 148–149° C.

Elemental analysis of the picrate: Calculated: C, 42.54%; H, 3.32%; N, 17.72%. Found: C, 42.36%; H, 3.45%; N, 17.50%.

Example 2

A solution prepared by dissolving 10 parts of 2-pyridinemethanol N-oxide and 5.5 parts of methylisocyanate into 60 parts by volume of pyridine was allowed to stand at room temperature for 12 hours. The reaction mixture was heated at 80° C. for 2 hours, and then the solvent was distilled off under reduced pressure. Recrystallisation of the residue from methanol gave 11 parts of 2-pyridinemethanol N-methylcarbamate (py)-N-oxide melting at 150–152° C.

Analysis of elements: Calculated: C, 52.74%; H, 5.33%; N, 15.38%. Found: C, 52.40%; H, 5.24%; N, 14.97%.

UV-spectrum: λmax. 263 mμ ($\epsilon$=14,400).

IR-spectrum: $\lambda_{max.}^{KBr}$ 3560, 3410, 1723, 1545, 1495, 1430 1255, 1160, 1045, 1025, 940, 843, 772.

This substance is administered by mouth in a dose of 5 to 30 mg. per kg. a day. In adults 0.3 mg., 0.5 mg. or 1 mg. of this substance is commonly used once or twice a day and the most common usage in adults is one gram of this substance once a day and in children it is 30 mg. per kg. once a day. A long term treatment with this substance is possible and there was found no appreciable untoward effects. The effect is rapid and almost twelve hours after the administration of this substance, the edematour swelling, heat and redness of joints or petechiae in rheumatic disorders disappear and the morning stiffness seen in rheumatoid arthritis shows a definite improvement.

The daily administration gives a favourable effect on the course of rheumatic disorders.

Examples 3 to 16

In a similar manner with Example 1 or 2, the following products were obtained from the following starting materials and isocyanates.

Example 3

Starting material: 3-pyridinemethanol N-oxide.
Isocyanate: methylisocyanate.
Product: 3-pyridinemethanol N-methylcarbamate (py)-N-oxide.
Melting point: 131–132° C. (from acetone).
Analysis of elements. Calculated: C, 52.74%; H, 5.33%, N, 15.38%. Found: C, 52.37%; H, 5.54%; N, 15.31%.
UV-spectrum: λmax. 266.5 mμ ($\epsilon$=12,670).

Example 4

Starting material:

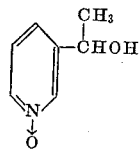

Isocyanate: methylisocyanate.
Product:

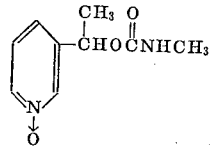

Melting point of the picrate of the product: 113–114° C. (from methanol).
Elemental analysis of the picrate: Calculated: C, 42.36%; H, 3.56%; N, 16.47%. Found: C, 41.98%; H, 3.87%; N, 16.40%.
UV-spectrum λmax. 266.5 mμ ($\epsilon$=13,200).

Example 5

Starting material: 4-pyridinemethanol N-oxide.
Isocyanate: methylisocyanate.
Product: 4-pyridinemethanol N-methylcarbamate (py)-N-oxide.
Melting point: 116–118° C. (from acetone-ether).
Analysis of elements: Calculated: C, 52.74%; H, 5.33%; N, 15.38%. Found: 52.30%, H, 5.64%; N, 15.05%.
UV-spectrum: λmax. 269 mμ ($\epsilon$=14,700).

Example 6

Starting material:

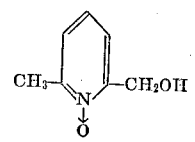

Isocyanate. methylisocyanate.
Product:

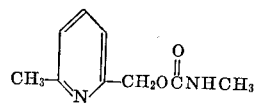

Melting point: 136–138° C. (from acetone).
Analysis of element: Calculated: C, 55.09%; H, 6.17%; N, 14.28%.
Found: C, 54.64%; H, 6.54%; N, 14.62%.
UV-spectrum: λmax. 260 mμ($\epsilon$=11,840).

Example 7

Starting material: 2-pyridinemethanol N-oxide.
Isocyanate: isobutylisocyanate.
Product: 2-pyridinemethanol N-isobutylcarbamate (py)-N-oxide.
Melting point of the picrate of the product: 127–129° C. (from methanol).
Analysis of elements of the picrate: Calculated: C, 45.03%; H, 4.22%; N, 15.45%.
Found: C, 45.21%; H, 4.30%; N, 15.39%.
UV-spectrum: $\lambda$max. 263m$\mu$($\epsilon$=12,300).

Example 8

Starting material: 2-pyridinemethanol N-oxide.
Isocyanate: allylisocyanate.
Product: 2-pyridinemethanol N-allylcarbamate (py)-N-oxide.
Melting point: 96–97° C. (from acetone-ether).
Analysis of elements: Calculated: C, 57.68%; H, 5.81%; N, 13.46%. Found: C, 57.62%; H, 5.80%; N, 13.49%.

Example 9

Starting material: 6-chloro-2-pyridinemethanol.
Isocyanate: methylisocyanate.
Product: 6-chloro-2-pyridinemethanol N-methylcarbamate.
Melting point: 54–56° C. (from acetone).
Analysis of elements: Calculated: C, 47.96%; H, 4.53%; N, 17.67%. Found: C, 48.15%; H, 4.63%; N, 17.69%.
UV-spectrum: $\lambda$max. 268 m$\mu$($\epsilon$=4400).

Example 10

Starting material: 6-cyano-2-pyridinemethanol.
Isocyanate: methylisocyanate.
Product: 6-cyano-2-pyridinemethanol N-methylcarbamate.
Melting point: 90–91° C. (from acetone-ether).
Analysis of elements: Calculated: C, 56.54%; H, 4.75%; N, 21.98%. Found: C, 56.09%; H, 4.63%; N, 21.70%.
UV-spectrum: $\lambda$max. 270 m$\mu$($\epsilon$=4400).

Example 11

Starting material: 6-cyano-2-pyridinemethanol.
Isocyanate: phenylisocyanate.
Product: 6-cyano-2-pyridinemethanol N-phenylcarbamate.
Melting point: 124–125° C. (from methanol).
Analysis of elements: Calculated: C, 66.39%; H, 4.38%; N, 16.59%. Found: C, 65.98%; H, 4.35%; N, 16.47%.
UV-spectrum: $\lambda$max. 263.5 m$\mu$($\epsilon$=4970).

Example 12

Starting material:

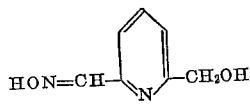

Isocyanate: methylisocyanate.
Product:

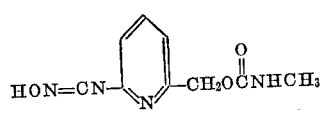

Melting point: 127–128° C. (from methanol).
Analysis of element: Calculated: C, 51.67%; H, 5.30%; N, 20.09%. Found: C, 51.46%; H, 5.33%; N, 20.37%.
UV-spectrum: $\lambda$max. 244 m$\mu$($\epsilon$=4110).

Example 13

Starting material:

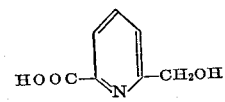

Isocyanate: methylisocyanate.
Product:

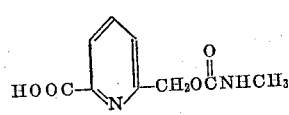

Melting point: 174–175° C. (from methanol).
Analysis of elements: Calculated: C, 51.42%; H, 4.80%; N, 13.33%. Found: C, 51.03%; H, 4.98%; N, 13.00%.
UV-spectrum: $\lambda$max. 224 m$\mu$, 262 m$\mu$($\epsilon$=7020).

Example 14

Starting material:

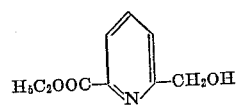

Isocyanate: methylisocyanate.
Product:

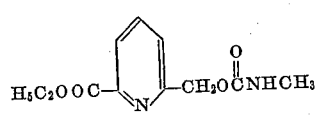

Melting point: 106–107° C. (from chloroform-ether).
Analysis of elements: Calculated: C, 55.45%; H, 5.92%; N, 11.76%. Found: C, 55.72%; H, 6.20%; N, 11.32%.
UV-spectrum: $\lambda$max. 269 m$\mu$ ($\epsilon$=10,650).

Example 15

Starting material:

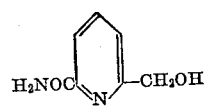

Isocyanate: methylisocyanate.
Product:

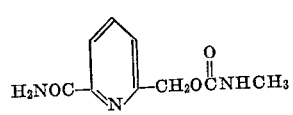

Melting point: 116–117° C. (from acetone-ether).
Analysis of elements: Calculated: C, 51.67%; H, 5.30%; N, 20.09%. Found: C, 51.29%; H, 5.69%; N, 19.77%.
UV-spectrum: $\lambda$max. 270 m$\mu$ ($\epsilon$=5080).

Example 16

In a mixed solution of 100 parts by volume of pyridine and 50 parts by volume of acetonitrile were added 15 parts of 2-pyridinemethanol N-oxide, 30 parts of S-ethyl-N-(2-furfuryl)-thiolcarbamate, and 15 parts of triethylamine. To the solution was added dropwise a solution of 26 parts of silver nitrate in 50 parts by volume of acetonitrile under cooling and stirring. After the completion of the addition the reaction mixture was allowed to stand at room temperature for 12 hours and then heated at 100° C. for 2 hours. After cooling, the mixture was diluted with chloroform and the precipitation was filtered off. The obtained residue was recrystallized from methanol to obtain 18 parts of 2-pyridinemethanol N-(2-furfuryl)-carbamate (py)-N-oxide melting at 140–142° C.
Analysis of elements: Calculated: C, 58.06%; H, 4.87%; N, 11.29%. Found: C, 57.75%; H, 5.06%; N, 10.95%.

UV-spectrum: λmax. 263 mμ (ε=24,200).

Example 17

In a similar manner with Example 16, 2-pyridinemethanol N-oxide was reacted with S-ethyl-N-(3-picolyl)-thiolcarbamate to obtain 2-pyridinemethanol N-(3-picolyl)-carbamate (py)-N-oxide melting at 102–104° C.

Analysis of elements: Calculated (%): C, 60.22%; H, 5.05%; N, 16.21%. Found (%): C, 59.87%; H, 5.39%; N, 15.99%.

UV-spectrum: λmax. 262 mμ (ε=15,100).

Example 18

A solution of 15 parts of 2-pyridinemethanol N-oxide and 45 parts of S-ethyl-N-(2-furfuryl)-thiolcarbamate in 100 parts by volume of pyridine was refluxed at a temperature of 130° C. for 15 hours. Then the solvent was distilled off under reduced pressure, the resultant residue was recrystallized from methanol to obtain 9.5 parts of 2-pyridinemethanol N-(2-furfuryl)-carbamate (py)-N-oxide melting at 140–142° C. Identification of the compound with an authentic sample was performed by a mixed melting point and comparison of their infrared spectra.

Example 19

A solution of 1 part of 2-pyridinemethanol N-oxide and 20 parts of nicotinyl azide in 200 parts by volume of pyridine was heated to 100° C. and was maintained at this temperature for 40 min. Then the reaction mixture was refluxed at 125° C. for 10 hours. Pyridine was distilled off from the reaction mixture and the resulting residue was recrystallized from methanol-acetone to obtain 18 parts of 2-pyridinemethanol N-(3-pyridyl)-carbamate (py)-N-oxide having the melting point of 142–143° C.

Analysis of elements: Calculated: C, 58.77%; H, 4.52%; N, 17.14%. Found: C, 60.03%; H, 4.85%; N, 16.87%.

UV-spectrum: λmax. 236 mμ (ε=11,330), 264 mμ (ε=11,400).

Example 20

In a simliar manner with Example 19, 10.3 parts of 6-carboxy-2-pyridinemethanol was reacted with 15 parts of nicotinyl azide to obtain 12 parts of 6-carboxy-2-pyridinemethanol N-(3-pyridyl)-carbamate melting at 135–136° C. (recrystallized from methanol).

Analysis of elements: Calculated: C, 57.14%; H, 4.05%; N, 15.38%. Found: C, 56.73%; H, 4.43%; N, 15.15%.

UV-spectrum: λmax. 235 mμ, 264.5 mμ (ε=17,800).

Example 21

In solution which was prepared by dissolving 4 parts of potassium metal in 100 parts of tert.-butanol under nitrogen, was added 12 parts of 2-pyridinemethanol N-oxide. The mixture was stirred for 2 hours and then added with 8 parts of ethylisothiocyanate. The reaction mixture was stirred for 12 hours at room temperature under nitrogen and then added with icewater, and neutralized with diluted hydrochloric acid. Most of the solvent was distilled off under reduced pressure, and the residue was extracted with chloroform. After removal of the solvent, the residue was recrystallized from acetone-isopropyl ether to obtain 10 parts of 2-pyridinemethanol N-ethyl-thiocarbamate (py)-N-oxide melting at 144–145° C.

Analysis of elements: Calculated: C, 50.94%; H, 5.70%; N, 13.20%. Found: C, 50.38%; H, 5.99%; N, 12.83%.

UV-spectrum: λmax. 247 mμ (ε=36,700).

Examples 22 and 23

In a similar manner, the following products were obtained.

Example 22

Starting material: 2-pyridinemethanol N-oxide.
Isothiocyanate: allylisothiocyanate.
Product: 2-pyridinemethanol N-allylthiocarbamate.
Melting point: 96–97° C. (recrystallized from benzene).

Analysis of elements: Calculated: C, 53.57%; H, 5.39%; N, 12.50%. Found: C, 53.40%; H, 5.38%; N, 12.47%. UV-spectrum: λmax. 249 mμ(ε=20500).

Example 23

Starting material: 2-pyridinemethanol N-oxide.
Isothiocyanate; phenylisothiocyanate.
Product: 2-pyridinemethanol N-phenylthiocarbamate.
Melting point: 149–150° C. (recrystallized from methanol).

Analysis of elements: Calculated: C, 59.99%; H, 4.65%; N, 10.77%. Found: C, 60.21%; H, 4.72%; N, 10.35%.

Example 24

To a solution of 22 parts of 2-pyridinemethanol in 40 parts of pyridine was added 31 parts of N,N-dimethylcarbamoyl chloride. The mixture was allowed to stand for 3 hours at room temeprature and then was heated to the temperature of 100° C. for 6 hours. The reaction mixture was distilled under reduced pressure to remove the pyridine and the residue was added with water and thereafter was made alkaline with aqueous sodium carbonate solution and was extracted with ether. After removal of the ether, the residue was distilled in vacuum to obtain 28 parts of 2-pyridinemethanol N,N-dimethyl-carbamate boiling at 120–125° C./4 mm. Hg. Its picrate melted at 151–152° C.

Elemental analysis of the picrate: Calculated: C, 44.01%; H, 3.69%; N, 17.11%; Found: C, 43.87%; H, 3.93%; N, 16.88%. UV-spectrum: λmax. 256 mμ, 262 mμ, (ε=3410) 267 mμ.

Example 25

To a solution of 10 parts of 6-methyl-2-hydroxymethypyridine and 11 parts of dimethylaniline in 600 parts by volume of toluene, was introduced 8 parts of phosgene at a temperature of −5° C. The reaction mixture was allowed to stand for 12 hours at 0° C., then the precipitated dimethylaniline hydrochloride was filtered off and the filtrate was added with 15 parts of diethylamine near at 0° C. under cooling. The mixture was shook for several hours in cold, then the toluene layer was separated, washed with aqueous sodium carbamate solution, dried. After the removal of the solvent under reduced pressure, the resulting residue was distilled in vacuum to obtain 3 parts of 6-methyl-2-pyridinemethanol N,N-diethylcarbamate boiling at 138–143° C./4 mm. Hg. A picrate of the product melted at 84–85° C.

Elemental analysis of the picrate Calculated: C, 47.89%; H, 4.69%; N, 15.52%; Found: C, 47.49%; H, 4.97%; N, 15.33%.

Example 26

To a solution of 7.2 parts of 6-chloro-2-hydroxymethylpyridine in 50 parts by volume of pyridine was added dropwise 8 parts of phenylchloroformate at a temperature of 5° to 10° C. under stirring. After the completion of the addition, the reaction mixture was stirred for 3 hours at room temperature, and then most of the pyridine was distilled off. Water was added to the residue, and then the resulting precipitation was filtered off and dried. The crystalline precipitation was dissolved in 50 parts by volume of ethyl alcohol and was added with 10 parts by volume of 48% monomethylamine solution. The mixture was allowed to stand at room temperature for 12 hours, and then the solvent was distilled off under reduced pressure. The residue was made alkaline with 5% sodium hydroxide solution and was extracted with ether. After removal of the either, the residue was crystallized from acetone to obtain 5.8 parts of 6-chloro-2-pyridinemethanol N-methylcarbamate melting at 54–55° C. Identification of the product with the sample obtained from Example 9 was performed by a mixed melting point and a comparison of their infrared spectra.

Examples 27–31

In a manner and yield similar to with Example 26, the following products were obtained.

and 10% sodium hydroxide solution. The chloroform layer was separated, and the solvent was distilled off. The residue was treated with methanolic hydrochloric acid and was crystallized from acetoneether to obtain 10 parts of 6-methyl-2-pyridinemethanol N-diethylcarbamate (py)-N-oxide melting at 122–124° C.

We claim:
1. A compound having the formula

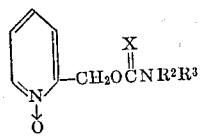

| Starting compound | Arylchloroformate | Amine | Product |
|---|---|---|---|
| Example 27 ... (2-pyridinemethanol N-oxide) | Phenylchloroformate | (CH₃)₂NH | (2-pyridylmethyl N,N-dimethylcarbamate N-oxide) |
| Example 28 ... (5-cyano-2-pyridinemethanol N-oxide) | Phenylchloroformate | CH₃NH₂ | (5-cyano-2-pyridylmethyl N-methylcarbamate N-oxide) |
| Example 29 ... (2-pyridinemethanol N-oxide) | p-Chlorophenylchloroformate | Allylamine | (2-pyridylmethyl N-allylcarbamate N-oxide) |
| Example 30 ... (4-pyridinemethanol N-oxide) | Phenylchloroformate | CH₃NH₂ | (4-pyridylmethyl N-methylcarbamate N-oxide) |
| Example 31 ... (3-pyridinemethanol N-oxide) | Phenylchloroformate | CH₃NH₂ | (3-pyridylmethyl N-methylcarbamate N-oxide) |

Example 32

To a solution of 15 parts of 2-pyridinemethanol N-dimethyl-carbamate in 60 parts by volume of glacial acetic acid was added 30 parts of 30% hydrogen peroxide solution. The reaction mixture was heated for 9 hours at 70–75° C., and then most of the solvent was distilled off under reduced pressure. In order to remove the remaining hydrogenperoxide, water was added to the residue and was distilled off under reduced pressure. The residue was made alkaline with potassium carbonate, and was extracted with chloroform. The solvent was distilled off, and the residue was treated with acetone. The obtained crystals were recrystallized from methanol-acetone to obtain 12 parts of 2-pyridinemethanol N-dimethylcarbamate (py)-N-oxide melting at 103–105° C.

Example 33

In an ethereal solution containing 11 parts of monoperphthalic acid was dissolved 12 parts of 6-methyl-2-hydroxymethyl-pyridine N-diethylcarbamate. The solution was allowed to stand at room temperature for 2 days. The precipitated crystalline substance was filtered, and the crystals were stirred with a mixture of chloroform wherein X is a member selected from the group consisting of oxygen and sulfur and $R^2$ and $R^3$ are each a member selected from the group consisting of hydrogen and (lower)alkyl.

2. A compound of claim 4 having the formula

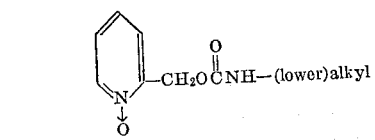

3. A compound of claim 4 having the formula

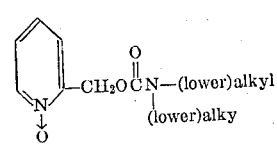

4. The compound of claim 4 which is 2-pyridinemethanol N-methyl-carbamate (py)-N-oxide.

5. The compound of claim 4 which is 2-pyridine-methanol N-dimethyl-carbamate (py)-N-oxide.

References Cited

UNITED STATES PATENTS 3,284,461  11/1966  Wilbert et al. _____ 260—295

FOREIGN PATENTS 945,824  1/1964  Great Britain.

OTHER REFERENCES

Culvenor: Reviews Pure and Applied Chemistry, vol. 3, pp. 83–90, (1953), Chem. Abstracts, vol. 53, Par. 10215 (1953) abstracting.

Kametani et al.: Chem. Pharm. Bull. (Tokyo), vol. 6, pp. 467–72, (1958).

HENRY R. JILES, *Primary Examiner.*

A. ROTMAN, *Assistant Examiner.*